W. F. DAWSON.
DYNAMO ELECTRIC MACHINE.
APPLICATION FILED MAY 5, 1905.

981,623.

Patented Jan. 17, 1911

3 SHEETS—SHEET 1.

WITNESSES:

INVENTOR:
WILLIAM F. DAWSON
By
ATTY.

W. F. DAWSON.
DYNAMO ELECTRIC MACHINE.
APPLICATION FILED MAY 5, 1905.

981,623.

Patented Jan. 17, 1911.
3 SHEETS—SHEET 2.

Witnesses.
Benjamin B. Hull
Helen Orford

Inventor:
William F. Dawson.
by Albert H. Dawson
Att'y.

W. F. DAWSON.
DYNAMO ELECTRIC MACHINE.
APPLICATION FILED MAY 5, 1905.

981,623.

Patented Jan. 17, 1911.

3 SHEETS—SHEET 3.

Witnesses

Inventor:
William F. Dawson.
by Albert H. Davis
Att'y

UNITED STATES PATENT OFFICE.

WILLIAM F. DAWSON, OF SCHENECTADY, NEW YORK, ASSIGNOR TO GENERAL ELECTRIC COMPANY, A CORPORATION OF NEW YORK.

DYNAMO-ELECTRIC MACHINE.

981,623. Specification of Letters Patent. Patented Jan. 17, 1911.

Application filed May 5, 1905. Serial No. 259,006.

*To all whom it may concern:*

Be it known that I, WILLIAM F. DAWSON, a citizen of the United States, residing at Schenectady, county of Schenectady, State of New York, have invented certain new and useful Improvements in Dynamo-Electric Machines, of which the following is a specification.

My present invention relates to dynamo electric machines and comprises certain novel features in the construction and arrangement of the ventilating means, the magnetic cores and the conductors of such machines.

The various features of novelty which characterize my invention are pointed out with particularity in the claims annexed to and forming a part of this specification. For a better understanding of my invention, however, reference may be had to the accompanying drawings and descriptive matter in which I have illustrated and described forms in which my invention may be embodied.

Figure 1:
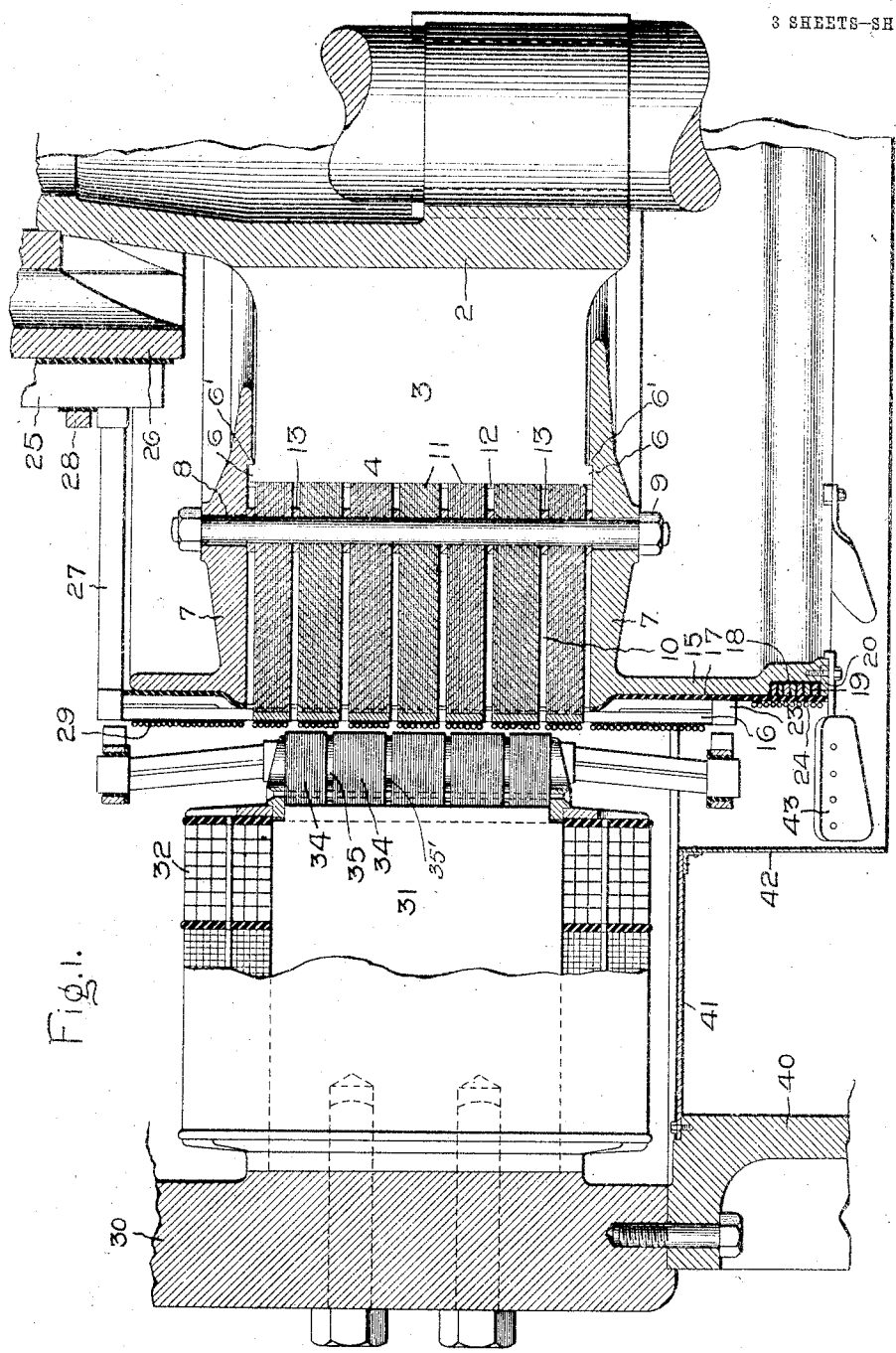
Figure 2:
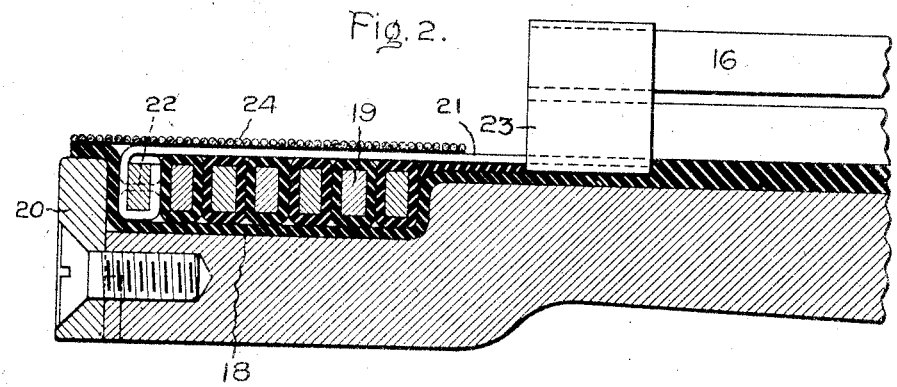
Figure 3:
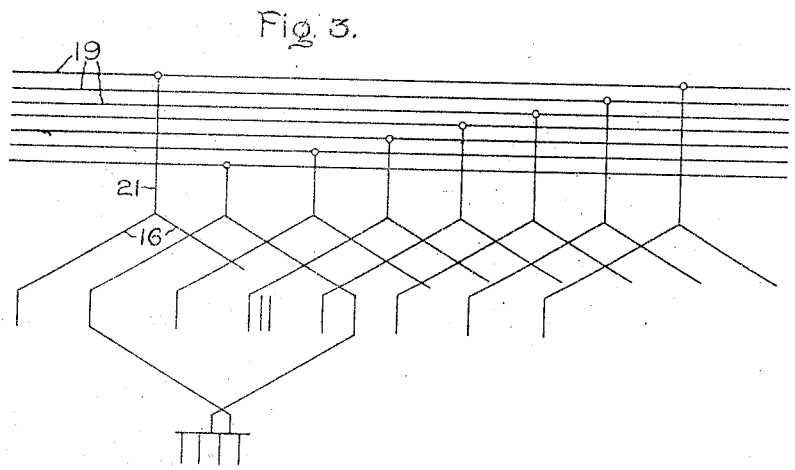
Figure 4:
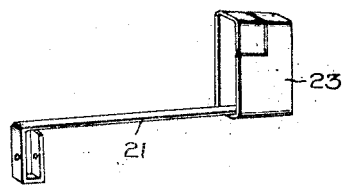
Figures 5, 6:
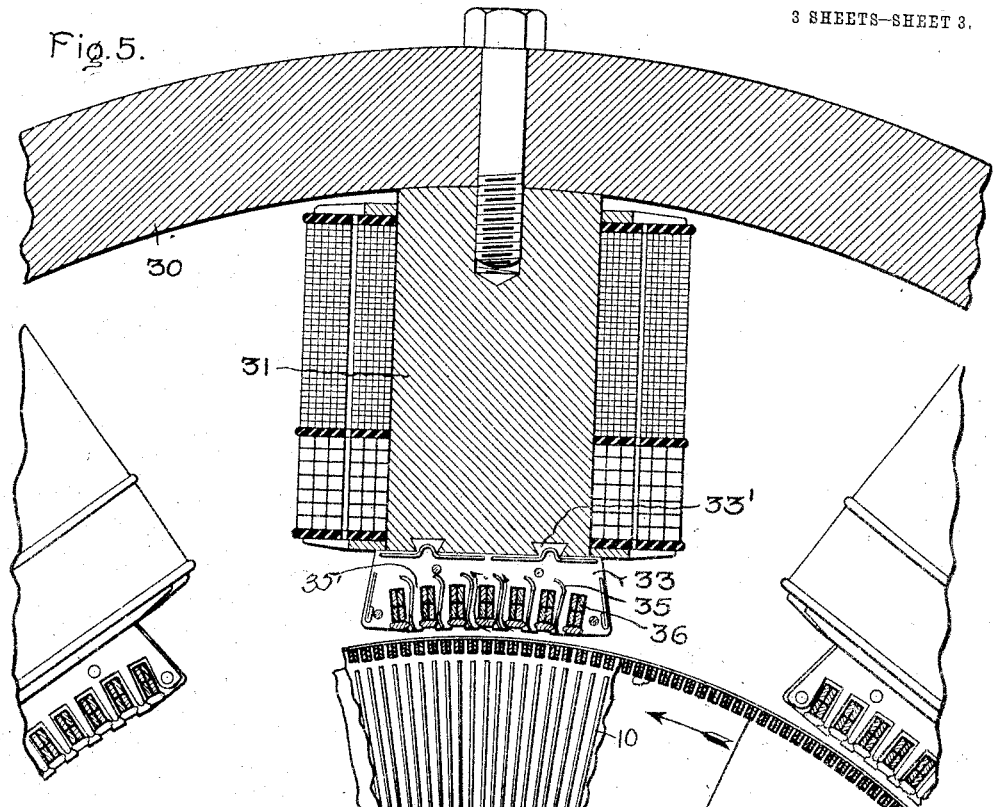

Of the drawings, Figure 1 is a sectional elevation with parts broken away of a vertical shaft dynamo electric machine; Fig. 2 a sectional view illustrating the equalizer conductor construction; Fig. 3 is a diagram showing the equalizing conductor connections; Fig. 4 is a perspective view illustrating the connecting means between the equalizing conductors and the armature conductors proper; Fig. 5 is a plan view with parts broken away and in section of the construction shown in Fig. 1; and Fig. 6 is a view with parts broken away and in section illustrating a modified construction.

In the particular construction shown in Figs. 1 to 5 of the drawings, I have shown my present invention embodied in an internal revolving armature direct current generator having its shaft adapted to be directly connected to the vertical shaft of a high speed prime mover such as a steam turbine.

The shaft 1 which as before stated is vertical has keyed upon it the hub 2 of a spider the arms 3 of which support the revolving laminated armature core 4. As is clearly shown in the drawings, the outer ends of the spider arms 3 are undercut at 3' to engage dovetail recesses 5 formed for the purpose in the core laminæ. The spider arms have formed at their outer ends projections 6 extending parallel with the shaft 1 which engage shoulders 6' formed on the inner surfaces of the radial portions of the end members 7 of the armature. The end members are clamped in place by bolts 8 and nuts 9. The bolts 8 pass through holes formed for the purpose in the laminæ. Suitable space blocks or ventilating strips 10 are placed at intervals in the laminated portions of the core to divide it into groups 11 separated by ventilating passages 12. Washers 13 are placed about the bolts 8 in the spaces between the groups of laminæ 11 and between the end groups of laminæ and the end members 7.

In the construction illustrated in the drawings, the laminæ are of the usual segmental form, each segment being provided with three full under-cut recesses 5 in which the ends of the spokes may be inserted, and two half recesses. It will of course be understood that in assembling, successive layers are displaced in order that the laminæ may breaks joints. Between each adjacent pair of recesses 5 a bolt 8 is located. It will be observed that with the particular construction illustrated a recess in each lamina is entered by a spider arm while some laminæ engage two spider arms. With the construction illustrated the core is locked to the spider through the engagement of the undercut ends of the spider arm with the registering recesses 5 of the core, by the friction between the laminæ and the end members due to the compression of the parts by the bolts 8, and by direct engagement of each segment with a number of bolts 8. In order to insure that each lamina properly engages the bolts 8 passing through it the holes or passages for the bolts 8 may be reamed out after the core is assembled. In order to prevent the magnetic flux carried by the core from setting up injurious eddy currents in the bolts 8, recesses 14 are extended from the inner surface of the core proper between the bolts 8, thus forming air gaps between the bolts, and materially reducing the flux passing through them. As shown, the recesses or air gaps 14 may be continuations of the undercut recesses 5 formed to receive the ends of the spokes 3.

The end members 7 are provided with the usual cylindrical flange portions 15 which support the projecting ends of the armature conductors 16, the usual layer of insulating material 17 being provided between the periphery of the flanges and the inner surfaces of the conductors. The flange portion 15 of the lower end of member 7 extends below the ends of the armature conductors 16 and has formed in it a circumferentially extending depression or groove 18. In the depression or groove 18 are located the equalizer conductors which are in the form of rings 19. These rings are of course suitably insulated from each other and from the flange. An annular member 20 is secured to the lower end of the flange portion of the lower end member in any suitable manner as by means of bolts tapped into the ends of the flange. The annular member 20 serves to lock the equalizer conductors or rings firmly in place.

Clips or connectors 21 extend from appropriate points in the armature winding to each equalizer ring. I prefer to form the connectors 21 in the manner clearly shown in Figs. 2 and 4. In this construction the connector 21 is in the form of a bar of conducting material the lower end of which is looped around the appropriate equalizer ring to which it may be secured by rivets 22. The body portion of the bar 21 passes over the top of the equalizer ring to which it is connected and over the tops of any rings which may be located above its ring and extends into the lower end of the sheet metal clip 23 which surrounds and connects the lower ends of a pair of armature conductors 16. In order to improve the electrical connection the ends of the conductors 16, the end of the connector 21, and the clip 23 may be soldered together. The connectors 21 are covered by a layer of insulating material and are bound firmly in place in any suitable manner as by means of a layer of binding wire 24. It will of course be understood that the usual means such as the layer of binding wire 29 are employed for preventing radial displacement of the conductors 16.

The construction just described possesses many important advantages. The connections between the equalizer rings and the armature conductors are short. The equalizer conductors are protected against mechanical injury and from dirt, and are secured in place along with the connectors 21 by means which prevent displacement under the influence of the centrifugal force generated at high speed. The upper ends of the conductors 16 are connected to the commutator bars 25 by radially extending conductors 27. The commutator bars are bound against their supporting shell 26 by shrink rings 28. As shown, the lower shrink ring 28 is just above the inner ends of the conductors 27. This arrangement tends to prevent the entrance of dirt with its consequent disadvantages into the spaces between the extreme inner ends of the conductors 27 and also prevents mechanical injury to the lower ends of the conductors 27 as for instance by the means employed for lubricating the commutator surface from time to time.

In the particular construction illustrated in Figs. 1 to 5 inclusive, the external field ring 30 has adjustably secured to it internally projecting solid pole pieces 31 about which the usual windings 32 are placed. The inner ends of the solid pole piece portions 31 have undercut grooves formed in their faces extending parallel to the axis of rotation of the armature. A laminated pole piece portion 33 is secured to the inner end of each pole piece 31 by means of tenons 33' formed for the purpose on the outer edges of the laminae 34 of the portion 33 which extend into undercut slots formed in the inner end from the pole pieces. The laminae 34 are divided into groups separated by ventilating space blocks or spacing strips 35. As shown the extreme inner ends of the strips 35 are not radial but are inclined to be parallel to the air currents set up by the armature.

Assuming that the armature rotates in the direction indicated by the arrow in Fig. 5, the air set in motion by the armature and passing into the ventilating spaces 35' formed by the spacing strips 35 has a direction of motion which is neither wholly radial nor wholly tangential, but has both a radial and a tangential component. The direction of the air currents entering the ventilating spaces 35' is shown by the small arrows in Fig. 5. The inner ends of the separators may be reversely inclined to the body of the separator in the inner ends as shown, though this is not essential. In the form of my invention shown in the drawings the laminated polar portions 33 are slotted to receive compensating windings 36, and the space blocks 35 are arranged one between each adjacent pair of slots.

To the field ring 30 or member 40 engaging its lower end is secured an annular member 41, the plane of which is transverse to the shaft 1. To the inner end of the member 41 is secured a downwardly extending cylindrical drum or member 42. The inner edge of the annular member 41 is located slightly beyond the inner ends of the solid pole piece portions 31. Fan blades 43 secured to the lower end of the cylindrical portion 15 of the lower end member 7 generate air currents which pass vertically downward through the machine to cool it. The member 41 and drum 42 serve as a casing for the fan blades 43 thereby increasing the effectiveness of the latter.

In order to get the best ventilating effects I have found it desirable to make the internal diameters of the end members 7 unequal. As shown the upper member 7 has a comparatively large opening through which air may enter the space inside the armature core. Most of the air thus entering passes out through the spaces 12 in the armature core. The internal diameter of the lower member 7 is such that a comparatively small passage exists between it and the hub of the spider. Through this passage a certain amount of air passes downward from the space within the armature core. By making the opening in the upper member 7 much larger than the opening in the lower member 7 as just described, the bulk of the air entering the space within the armature core through the upper opening is caused to pass radially out of the armature core through the ventilating spaces. A small quantity of air, however, passes through the opening in the lower member and assists in cooling the underside of the armature core. A further advantage of employing a small air passage through the lower member 7 is that it tends to prevent the formation of comparatively stationary hot air in the space within the armature core adjacent the lower end member 7 and gives a more equal flow of air through the various passages 12.

In the construction shown in Fig. 6 I have shown an internal field member 45 revolving in the direction shown by the large arrow. The coöperating external laminated armature core 46 supported by the frame or ring 47 has formed in it ventilating spaces by ventilating strips or spacers 48 inserted in the usual manner between certain of the laminæ of the core. The inner ends of the blocks or spacers 48 are arranged parallel to the line of movement of the air set in motion by the revolving field. As shown, these space blocks may be substantially the same as those shown in Fig. 5 and may be arranged one between each adjacent pair of slots 49 in which the armature conductors are located. The use of barriers or deflectors such as are formed by the bent inner ends of the space blocks in the construction shown, located in the ventilating spaces of the stationary core and extending substantially parallel to the direction of the air currents generated by the revolving member of the machine, materially increases the flow of air through the ventilating ducts and thereby produces a more efficient cooling of the machine. The increased flow of air due to the use of these barriers or deflectors is largely due to the fact that they decrease whirls or eddy currents of air in the space between the revolving and stationary members of the machine.

While I have hereinbefore described and illustrated somewhat in detail the best form of my invention now known to me, it will be obvious that changes may be made in the form of the embodiment disclosed without departing from the spirit of my invention, and that certain features of my invention may sometimes be used without a corresponding use of other features of my invention.

What I claim as new and desire to secure by Letters Patent of the United States, is,—

1. In a dynamo electric machine, an internal rotating member, an external stationary member, said stationary member having a core portion or portions formed of laminated material separated into groups with ventilating spaces between the groups, and deflectors or barriers located in said spaces, the ends of said barriers or deflectors adjacent the revolving member being inclined to the radial direction and substantially parallel to the line of motion of the air set in motion by the revolving body.

2. In a dynamo electric machine, an internal rotating member and an external stationary member, said stationary member having a core portion or portions provided with a ventilating space, a deflector or barrier located in said ventilating space, the end of said deflector or barrier adjacent the revolving member being parallel to a line which divides the angle between the radial and tangential components of the motion at the end of the deflector of the air moved by the revolving member.

3. In a dynamo electric machine, a rotating shaft, a member carried thereby, a coöperating annular stationary member surrounding the first, an annular disk-like member the peripheral edge of which is secured to the stationary member, a cylindrical drum concentric with the shaft secured to the inner edge of said annular member, the internal diameter of said drum being slightly greater than that of said stationary member, and fan vanes or blades secured to the shaft carried member and extending beyond the periphery of the body portion thereof, said vanes or blades being located within said drum.

4. In a dynamo electric machine, an internal rotating member, and an external stationary member, said stationary member having a core portion or portions formed of laminated material separated at intervals by space blocks or separators to form ventilating spaces, the ends of said space blocks adjacent the revolving member being inclined to the radial direction and substantially parallel to the line of motion of the air set in motion by the revolving body.

5. In an armature, a laminated core, an end member therefor provided with a cylindrical flange adapted to support the ends of the armature conductors, said flange having a circumferentially extending groove or depression formed in it, and an equalizing conductor located in said groove or depression.

6. In an armature, a core, a winding therefor, an armature head provided with a flange for supporting the ends of said winding, equalizing conductors in the form of rings also mounted on said flange, connections between said rings and said winding each comprising a bar or strip having one end looped about the appropriate ring with its body portion extending over the ring to which it is connected and over any other rings which may be located between it and the winding, the other end of said bar or strip being connected to the winding.

7. In an armature, a core, conductors therefor in the form of bars, the ends of certain of said bars being connected together in pairs by sheet metal clips or shells surrounding them, a support for the ends of the bars which project beyond the core proper, equalizing rings carried by said support, and connections between said rings and said conductors, each of said connections comprising a bar or strap having one end connected to the appropriate ring and the other end passed into the clip or shell surrounding the appropriate pair of bars.

8. In an armature, a laminated core, an end member therefor provided with a flange, armature conductors resting at one end upon said flange, said flange having a circumferential groove or depression formed therein, and an equalizing conductor arranged in said groove or depression.

9. In an armature, a core, a winding therefor, a support for the ends of said winding, and equalizing conductors in the form of rings mounted on said support beyond the ends of said armature conductors.

10. In an armature, a core, a winding therefor, a support for the ends of said winding, equalizing conductors in the form of rings mounted on said support, a layer of insulating material surrounding the equalizing conductors, and a binding band or bands for securing the insulating material and rings in place.

11. In an armature, a core, a head therefor provided with a cylindrical flange portion, a depression formed in the end of the flange portion remote from the core, equalizing rings located in said depression, and an annular member secured to the ends of said flange to hold the equalizing rings in place.

12. In combination, a laminated annular core having recesses formed in its inner curved surface, a spider having arms, the ends of which extend into said recesses, and bolts passing through said core, said recesses being extended to form slots limiting the flux passing through said bolts.

13. In combination, a laminated core having slots formed in it extending transversely to the planes of lamination, a supporting member therefor provided with projections which enter said slots, and bolts passing through said core parallel to and between adjacent slots, said slots being extended to form air gaps tending to prevent the core flux from passing through said bolts.

14. In combination, a laminated core having slots formed in it extending transversely to the planes of lamination the outer portions of the sides of said slots being undercut, a supporting member for the core having undercut projections which enter the undercut portions of said slots, said slots being extended to form relatively deep air gaps in said core at the inner sides of the projections.

15. In a dynamo electric machine, an internal rotating member, an external stationary member, said stationary member having a core portion or portions provided with ventilating passages, the ends of said passages adjacent the revolving member being parallel to a line which divides the angle between the radial and tangential components of the motion of the air moved by the revolving member.

16. In an armature, a core, a head therefor provided with a cylindrical flange, armature conductors resting at one end upon said flange, said flange having a depression formed therein beyond the ends of the armature conductors, and equalizing rings located in said depression.

17. In an armature, a core, a head therefor provided with a cylindrical flange portion, armature conductors having one end supported upon said flange portion, said flange portion having a depression formed therein at the end remote from the core, equalizing rings located in said depression, and an annular member secured to the ends of said flange portion to hold the equalizing rings in place.

18. The combination with a slotted armature core, a supporting structure therefor having an annular recess, and a winding in the core slots, of a plurality of flat ring conductors located side by side in the recess, sheet metal clips fastened to the ends of armature conductors corresponding to equipotential points of the winding, and strap conductors having their ends fastened to said sheet metal clips and to corresponding flat ring conductors.

In witness whereof, I have hereunto set my hand this 3rd day of May, 1905.

WILLIAM F. DAWSON.

Witnesses:
BENJAMIN B. HULL,
HELEN ORFORD.